United States Patent
Kudelski

(10) Patent No.: US 7,313,665 B2
(45) Date of Patent: Dec. 25, 2007

(54) MULTI-PROCESSOR DATA VERIFICATION COMPONENTS FOR SECURITY MODULES

(75) Inventor: André Kudelski, Lutry (CH)

(73) Assignee: Nagracard S.A., Cheseaux-sur-Lausanne (CH)

( * ) Notice: Subject to any disclaimer, the term of this patent is extended or adjusted under 35 U.S.C. 154(b) by 281 days.

(21) Appl. No.: 11/142,309

(22) Filed: Jun. 2, 2005

(65) Prior Publication Data

US 2005/0270840 A1 Dec. 8, 2005

(30) Foreign Application Priority Data

Jun. 3, 2004 (EP) .................................. 04102505

(51) Int. Cl.
 *G06F 12/14* (2006.01)
 *G06F 15/167* (2006.01)
 *G06K 19/067* (2006.01)

(52) U.S. Cl. ..................... 711/163; 711/103; 711/115; 711/147; 709/213; 709/216; 713/193; 235/492

(58) Field of Classification Search ................ 711/103, 711/115, 147, 149, 163; 713/193; 235/492; 709/213, 216
See application file for complete search history.

(56) References Cited

U.S. PATENT DOCUMENTS

| | | | |
|---|---|---|---|
| 5,666,412 A | 9/1997 | Handelman et al. | |
| 5,774,546 A | 6/1998 | Handelman et al. | |
| 6,839,849 B1 | 1/2005 | Ugon et al. | |
| 6,944,649 B1 * | 9/2005 | Suzuki | 709/213 |
| 2003/0084194 A1 * | 5/2003 | Ryan | 709/250 |
| 2003/0093615 A1 | 5/2003 | De Jong | |
| 2005/0055549 A1 | 3/2005 | Fischer | |

FOREIGN PATENT DOCUMENTS

| | | |
|---|---|---|
| DE | 198 11 646 | 9/1999 |
| FR | 2 787 900 | 6/2000 |
| FR | 2 843 154 | 6/2003 |

* cited by examiner

*Primary Examiner*—Jack Lane
(74) *Attorney, Agent, or Firm*—Harness, Dickey & Pierce, P.L.C.

(57) ABSTRACT

The aim of this invention is to improve in an optimal way the security of smart cards to prevent the fraudulent control of a cryptographic processor(s) by means of external signals that interfere with the normal development of the tasks of a processor(s). This aim is reached by a component IC of a security module comprising at least two processors CPU A, CPU B each connected to program memories ROM A, ROM B, to non-volatile programmable and erasable memories (EEPROM) EEPROM A, EEPROM B containing the data and random access memories (RAM) RAM A, RAM B that serve as temporary data storage during processing, the first processor CPU A having an interface bus toward an exterior of the component IC, characterized in that the second processor CPU B is connected to the first processor CPU A through an exchange memory DPR, the non-volatile programmable and erasable memory EEPROM A of the first processor CPU A having read-only access R for said first processor CPU A, the second processor CPU B having read and write access R/W on said non-volatile programmable and erasable memory EEPROM A of the first processor CPU A.

17 Claims, 1 Drawing Sheet

MULTI-PROCESSOR DATA VERIFICATION COMPONENTS FOR SECURITY MODULES

BACKGROUND OF THE INVENTION

The present invention relates to the domain of security modules containing at least one processor and memories generally in the form of smart cards. These are available with or without contacts and are used in different applications requiring security transactions such as, for example, payment, exchanging of confidential data or access control.

PRIOR ART

As is well known to those skilled in the art, the security module can essentially be produced according to three different forms. One of these is a microprocessor card, a smart card, or more generally an electronic module (taking the form of a key, a badge, . . . ). This type of module is generally removable and connectable to a digital pay television decoder. The form with electric contacts is the type used most frequently, however a connection without contact is not excluded, for example, of the type ISO 14443.

A second known form is that of an integrated circuit, generally placed in a definitive and irremovable way in the decoder. An alternative is made up of a circuit that is welded or mounted onto a base or even a connector such as a SIM module connector.

In a third form, the security module is integrated into an integrated circuit that also has another function, for example, in a descrambling module of the decoder or the microprocessor of the decoder.

More particularly, in the field of digital pay television these security modules take the form of cards. They serve as means for the personalization and protection of access to encrypted programs received by decoders installed at the location of the subscriber.

In order to improve the security of access to conditional access data and to prevent different attempts at fraud, several solutions have been adopted such as: a material encapsulation of the security module, sophisticated encrypted algorithms, encryption/decryption keys with a high binary size, a multiplicity of cards or processors as described in the documents U.S. Pat. No. 5,666,412 or U.S. Pat. No. 5,774,546.

In these last two examples a Pay-TV decoder is equipped with a card reader with two openings into each of which a smart card is inserted. The first card comprises an identification element including the partially encrypted personal and official data. The second smart card comprises an application element containing the access keys and algorithms that allow access to data contained in the identification element of the first card. This type of configuration is presented in particular in a parental control device that requires a second access control level by using a particular key.

According to one alternative to the document mentioned, the chips or integrated circuits of each of the two cards are grouped together on only one support, in this way constituting a single card whose integrated circuits are separately accessible by the card reader. This card includes the necessary data that define several decryption levels allowing access to data contained in either of the two integrated circuits.

The means of the prior art applied to improve the security of the access cards to encrypted programs are sometimes shown to be vulnerable to certain attacks, in particular to attacks by interferences or "glitch attacks". It concerns a method for the violation of the security of a cryptographic processor by interrupting the execution of one or several instructions. The attacker analyzes the signals generated by a specific sequence of instructions issued by the processor and at the precise moment of the execution of a comparison or jump instruction applies the interference signals on the bus linked to the processor via the card reader, for example. These signals in the form of brief pulse trains block the execution of instructions or short circuit critical authentication programs thus allowing free access to protected data.

AIM OF THE INVENTION

The aim of this invention is to improve in an optimal way the security of the smart cards to prevent the fraudulent control of a cryptographic processor(s) by means of external signals that interfere with the normal development of the tasks of the processor(s).

BRIEF DESCRIPTION OF THE INVENTION

The aim of the invention is achieved by a security module component comprising at least two processors each connected to program memories, to non-volatile erasable programmable memories (EEPROM) containing the data and to random access memories (RAM) that serve as temporary data storage during processing, the first processor having an interface bus with the exterior of the component characterized in that the second processor is connected to the first processor by means of an exchange memory (DPR), the non-volatile programmable and erasable memory of the first processor having read-only access through said first processor, the second processor having read and write access on said non-volatile programmable and erasable memory of the first processor.

Component is understood to mean a unit including all the elements necessary for cryptographic operations and brought together on a unique support in order to ensure its security. These components are generally made up of a single electronic chip, a chip which disposes of a mechanical or electronic anti-intrusion protection. Other structures composed, for example, of two electronic chips are also included in the denomination "component" as they are closely connected and provided by distributors as only one element.

This component preferably manufactured on a single silicon chip is generally implanted into a portable support, usually a removable smart card. The latter is equipped with accesses connected to the first processor that is made up either of a contact assembly arranged on one of the faces of the card according to regulation ISO 7816, or made up of an antenna that allows data exchanges in an electromagnetic way without galvanic contact (according to ISO 14443) with a suitable read-write device.

According to another embodiment of the component, the same is part of a larger electronic module comprising capabilities to process encrypted data.

One part of this module process, for example the encrypted DBV data and the component, is only a piece of silicon in charge of the security aspect of this decryption. It is to be noted that the electronic module can be either mounted within the reception unit or be connected in a removable manner in said reception unit.

The configuration of the component according to this invention allows the complete isolation of the second processor in reference to external accesses. In fact, there is no direct connection between the two processors that would allow access to the second processor with the aid of adequate instructions transmitted to the first processor via the external accesses. The memories that connect the two processors act as a barrier that on one hand serves to block undesirable commands originating from external accesses and on the other hand serves to prevent analysis, via the same accesses, of the signals that move between the two processors.

The first processor cannot modify its programme itself. Each modification of its programme must be verified by the second processor.

The second processor can in this way carry out the cryptography operations independently of the operations executed by the first processor. Furthermore, the latter cannot carry out certain critical tasks related to security without the authorization of the second processor.

The invention will be better understood thanks to the following detailed description that refers to the single annexed figure given as a non-limitative example.

DETAILED DESCRIPTION OF THE INVENTION AND OPERATION EXAMPLES

Figure 1:
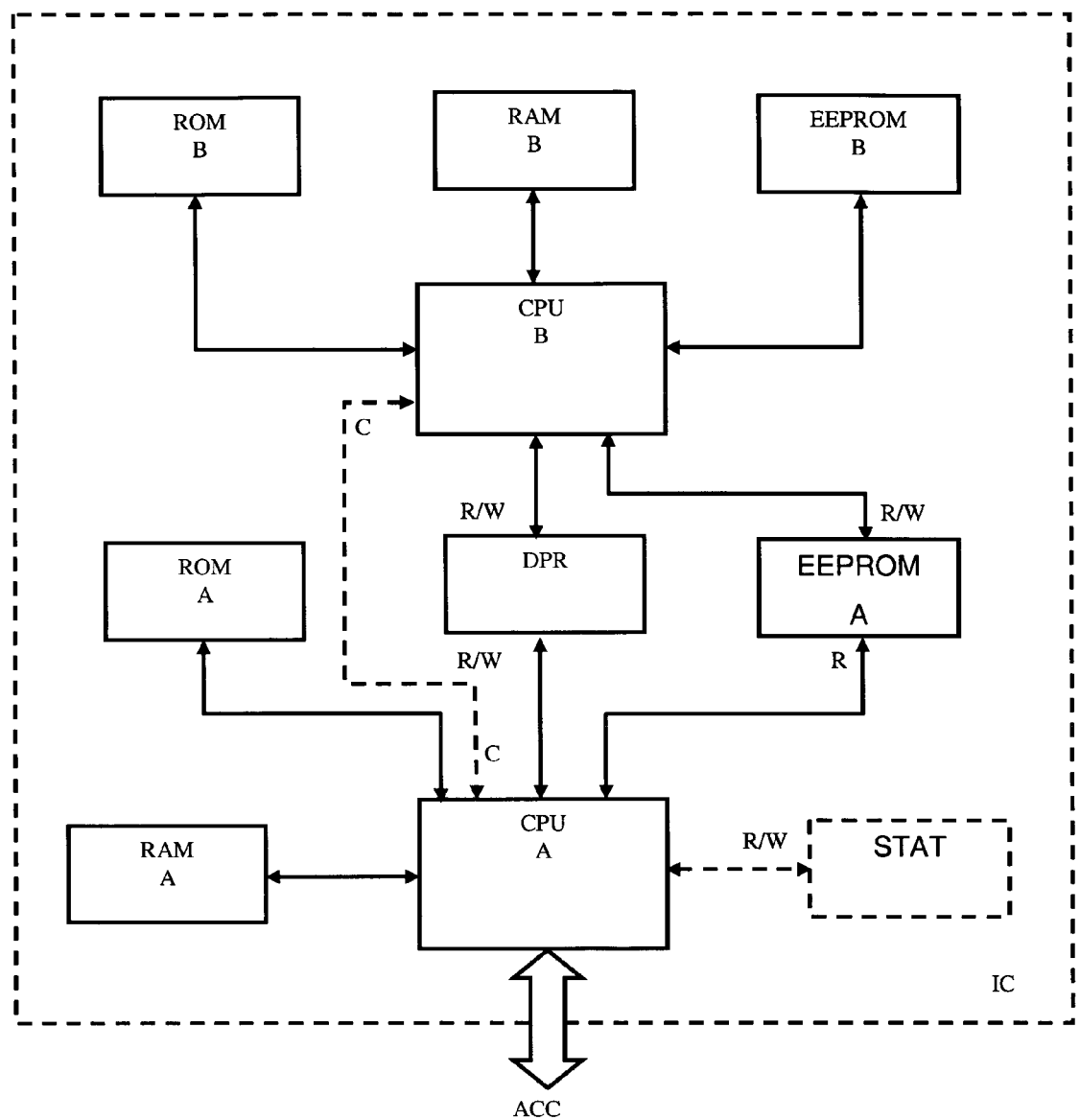
FIG. 1 shows a block scheme of a security module component comprising two processors each connected to a memory set and connected to one another by an exchange memory.

The component IC in FIG. 1 is generally produced on a single chip that is mounted on a portable support constituted, according to an exemplary embodiment, of a card equipped with access ACC in the form of contacts or an antenna.

The component IC includes two processors CPU A, CPU B linked by means of an exchange random access memory DPR and by a non-volatile programmable and erasable memory EEPROM A. The first processor CPU A is connected on one hand to access ACC and on the other hand to a random access memory RAM A and to a read only memory ROM A. The second processor CPU B is also connected to a random access memory RAM B and to a read only memory ROM B as well as a non-volatile programmable and erasable memory EEPROM B.

According to one alternative, a supplementary non-volatile programmable and erasable memory STAT can be connected in a read/write R/W way to the first processor CPU A. This serves for storing, for example, data concerning the working history of the component that would be accessible in reading from the exterior via the accesses ACC.

One of the essential particularities according to the invention consists in that the connection of the first processor CPU A with the non-volatile programmable and erasable memory EEPROM A is configured in read only R while the connection with the second processor CPU B is configured both in reading and in writing R/W. Another aspect of this invention is the presence of the exchange random access memory DPR whose connections to each of the processors CPU A and CPU B are configured in reading and in writing R/W.

The first processor CPU A of this component, accessible from the exterior, is responsible for executing known tasks of the security modules, that is to say such as the management of the control words CW and the control messages ECM as well as the verification of the rights of the card. One can imagine that security operations such as authentication, the decryption of management message EMM or the management of keys and of decryption algorithms are intended for the second processor CPU B.

The second processor CPU B manages and executes all the security operations that require encryption/decryption keys stored, for example, in the read only memory ROM B. The non-volatile programmable and erasable memory EEPROM B contains the programs as well as the algorithms necessary for decryption according to instructions communicated by the first processor CPU A via the exchange random access memory DPR.

Thanks to the configuration in read only way of the first processor CPU A, the contents of the non-volatile programmable and erasable memory EEPROM A cannot be modified from the exterior. Each instruction of the processor issued through commands received via the access ACC is temporarily stored in exchange random access memory DPR and its execution is verified by the second processor CPU B before the resultant data is stored by said second processor CPU B in the non-volatile memory EEPROM A via the port R/W.

According to one alternative, the processor CPU B can directly control the processor CPU A by means of a connection C without passing through the exchange memory DPR. This type of control allows, for example, the activation or rapid blocking of the processor CPU A according to the result of a verification carried out by the processor CPU B.

A card that includes a component as described previously can be used in a digital pay television decoder where a high level of security is demanded on one hand, at the level of access rights to encrypted data of a video audio flow transmitted by cable or satellite and on the other hand, at the level of the operating software of the card.

One function of the card consists in controlling access to the encrypted data of an audio flow video received by the decoder by verifying the control messages ECM that accompany said encrypted data. When this verification is completed, the decryption of the data of the flow is authorized according to the access rights to the audio video data included in the ECM message.

In order to define the rights of a user, the management centre sends the management messages EMM that are generally individual, namely encrypted by a unique key for this user. According to one application example of the invention, this type of message cannot be decrypted by the processor CPU A since the latter does not dispose of the unique personal key of the user. This key can be symmetrical or asymmetrical (private key and public key).

The memory that will contain this right is the memory EEPROM A in our example. Since this memory is accessible in write only through the processor CPU B, the processor CPU A will transmit the management message EMM to the processor CPU B via the exchange memory DPR. The processor CPU B will begin its decryption cycle of the message, and after verification, will update the memory EEPROM A with the new rights.

It is also possible to place these rights in the memory STAT according to another alternative. In this case, the result of the decryption of the message EMM will be transmitted to the processor CPU A via the exchange memory DPR in order to be stored in the memory STAT.

The downloading of the software of the card stored in the non-volatile memory EEPROM A or the updating of this software is managed with a greater security in a card equipped with a component according to the invention. In fact, it will not be possible to store software in such a card via the accesses ACC and the processor CPU A without carrying out verifications by means of the processor CPU B.

The software or an update is received through the decoder in the form of encrypted blocks that will be then conveyed one by one to the first processor CPU A via the accesses ACC of the card. The processor CPU A cannot decipher them because it does not dispose of the corresponding key. These blocks are transmitted to the CPU B via the exchange memory DPR. The CPU B will launch a decryption process in a secure way and thus uninterruptible. The result of this operation is stored in a specific memory of the CPU B, that is to say EEPROM B.

It is foreseen that the verification value or the signature will be contained in a management message EMM. The CPU B receives this message via the exchange memory DPR and can calculate the signature of the data block previously deciphered and compare it with the signature received in the message.

Only once this verification has been carried out will the CPU B initiate a write cycle of the memory of the CPU A, namely EEPROM A.

In the case where the result of this comparison is negative, the downloading or updating process of the software is stopped and the processor CPU A transmits either an error message to the decoder, or a download re-initialisation command.

When all the blocks are successfully verified and stored in the memory EEPROM B, the processor CPU B transfers said blocks to the memory EEPROM A. The processor CPU B is then responsible for the installation and activation of the new software.

According to one alternative, before the transfer of a block towards the memory EEPROM A, the assembly of blocks stored in memory EEPROM B can be verified again by the processor CPU B by calculating a signature on the totality of the blocks. The comparison is then carried out with the global signature of the software also obtained via a message EMM.

According to one working alternative, the management messages EMM are processed by the CPU A. It should be noted that at the time of each decryption session of these EMM messages, the processor CPU A requests the key necessary to the processor B for the direct execution of the decryption. Once the decryption has been completed, the key is erased and only stored in the random access memory RAM A of the CPU A. There is thus no intermediate storage of the key in a non-volatile memory EEPROM A that in this way would consequently be accessible in reading via the accesses ACC. Only the intermediate calculation results are stored in the random access memory RAM A and the processor CPU A transfers the final data (rights for example) in the memory STAT.

If the number of security tasks increases and exceeds the capacity of only one processor, it is possible to multiply the number of processors according to the complexity of the operations to be executed. The block scheme of this type of configuration would be an extension of that in FIG. 1 wherein each supplementary processor would be connected to an exchange random access memory DPR with two ports, one of which would be linked to the first processor that has the accesses towards the exterior.

According to one alternative, the exchange random access memory DPR of separation can have as many supplementary ports as necessary for the connection of additional processors.

The invention claimed is:

1. A component of a security module comprising at least two processors each connected to program memories, to one or more non-volatile programmable and erasable memories containing data, and to one or more random access memories serving as temporary data storage during processing, a first processor having an interface bus toward an exterior of the component, wherein a second processor is connected to the first processor by an exchange memory, a non-volatile programmable and erasable memory of the first processor having read only access for said first processor, the second processor having read and write access on said non-volatile programmable and erasable memory of the first processor.

2. The component according to claim 1, wherein the exchange memory includes a random access memory intended for temporary data storage, said exchange memory being equipped with two ports, each configured in read and write, one of which is connected to the first processor and the other one to the second processor.

3. The component according to claim 1, wherein said component is mounted on a portable support including one or more accesses intended for the exchange of data with an external processing unit, said one or more accesses being connected to the first processor via the interface bus.

4. The component according to claim 3, wherein the component is mounted on a card provided with galvanic contacts, of ISO 7816 format, forming the accesses, said card functioning as a removable security module in a Pay-TV decoder.

5. The component according to claim 1, wherein the first processor is configured for executing known tasks of the security modules and wherein the second processor is configured for managing and executing one or more security operations such as authentication, decryption of keys, management of keys, and decryption algorithms.

6. The component according to claim 5, wherein the second processor is configured for verifying data received via one or more accesses connected to the first processor via the interface bus and the exchange memory, said data being temporarily stored in a non-volatile memory of the second processor at the time of verification.

7. The component according to claim 6, wherein the second processor is configured for storing the verified data in the non-volatile memory of the first processor.

8. The component according to claim 1, wherein the program memories and the one or more non-volatile programmable and erasable memories contain the programs as well as the algorithm definitions necessary for decryption according to instructions communicated by the first processor via the exchange memory.

9. The component according to claim 1, wherein the component includes at least one supplementary processor connected in read/write to a first port of a non-volatile programmable and erasable supplementary memory, a second port of said memory being connected in read only to the first processor.

10. The component according to claim 1, wherein the component includes at least one supplementary processor connected in read/write to a supplementary port of the non-volatile programmable and erasable memory of the first processor, said memory being connected in read only to the first processor.

11. The component according to claim 1, wherein the component further includes a supplementary nonvolatile programmable and erasable memory connected to the first processor, the first processor having read and write access to the supplementary nonvolatile programmable and erasable memory.

12. The component according to claim 1, wherein the component further includes a supplementary processor and a supplementary exchange memory, the supplementary processor being connected to the first processor by the supplementary exchange memory.

13. The component according to claim 1, wherein the component further includes at least one supplementary processor connected to the first processor by the exchange memory.

14. A component for a security module, the component comprising:
  a first processor and a second processor;
  an exchange memory connected to the first processor and to the second processor, the first processor and second processor having read and write access to the exchange memory;
  a non-volatile programmable and erasable memory connected to the first processor and to the second processor, the first processor having read only access to the non-volatile programmable and erasable memory and the second processor having read and write access to the non-volatile programmable and erasable memory.

15. The component according to claim 14 in combination with a support including one or more accesses suitable for use in exchanging data with an external processing unit, the component being mounted on the support so that the one or more accesses are operatively connected to the first processor.

16. The component according to claim 15, wherein the first processor transmits data received by the one or more accesses to the second processor via the exchange memory, the second processor being configured for verifying the data, said data being temporarily stored in a non-volatile memory of the second processor at the time of verification.

17. The component according to claim 16, wherein the second processor is configured for storing the data in the non-volatile memory of the first processor after the data is verified.

* * * * *